US012296343B2

(12) United States Patent
Mayenberger et al.

(10) Patent No.: US 12,296,343 B2
(45) Date of Patent: May 13, 2025

(54) SAMPLE CONTAINER ARRANGEMENT

(71) Applicant: Qiagen Lake Constance GmbH, Stockach (DE)

(72) Inventors: Rupert Mayenberger, Rielasingen (DE); Josef Drexler, Stockach (DE)

(73) Assignee: DIALUNOX GMBH, Stockach (DE)

( * ) Notice: Subject to any disclaimer, the term of this patent is extended or adjusted under 35 U.S.C. 154(b) by 142 days.

(21) Appl. No.: 16/337,168

(22) PCT Filed: Sep. 28, 2017

(86) PCT No.: PCT/EP2017/074613
§ 371 (c)(1),
(2) Date: Mar. 27, 2019

(87) PCT Pub. No.: WO2018/060326
PCT Pub. Date: Apr. 5, 2018

(65) Prior Publication Data

US 2019/0224683 A1 Jul. 25, 2019

(30) Foreign Application Priority Data

Sep. 29, 2016 (EP) .................................... 16020361

(51) Int. Cl.
*B01L 7/00* (2006.01)
*B01L 3/00* (2006.01)
*B01L 9/00* (2006.01)

(52) U.S. Cl.
CPC ................. *B01L 7/52* (2013.01); *B01L 3/508* (2013.01); *B01L 9/52* (2013.01); *B01L 2200/025* (2013.01); *B01L 2200/0689* (2013.01); *B01L 2200/147* (2013.01); *B01L 2300/0803* (2013.01); *B01L 2300/1816* (2013.01);

(Continued)

(58) Field of Classification Search
CPC ....... B01L 2300/1822; B01L 2200/147; B01L 2200/0689; B01L 2200/025
USPC .................................................. 422/554, 561
See application file for complete search history.

(56) References Cited

U.S. PATENT DOCUMENTS 7,754,474 B2 7/2010 Aysta et al.
2004/0023371 A1* 2/2004 Fawcett .................... B01L 7/52 435/303.1

(Continued)

FOREIGN PATENT DOCUMENTS

EP 2263802 A1 12/2010
WO 2004105947 A2 12/2004
WO 2005107938 A2 11/2005

OTHER PUBLICATIONS

International Search Report of International Patent Application No. PCT/EP2017/074613 dated Dec. 6, 2017.

*Primary Examiner* — Natalia Levkovich
(74) *Attorney, Agent, or Firm* — McBee, Moore & Vanik IP, LLC

(57) ABSTRACT

The invention provides a sample container arrangement comprising a carrier for at least one sample container and a tempering module, comprising at least one tempering element and being at least sectionally in contact with the carrier such that the at least one tempering element is suitable to temper the at least one sample container, wherein the sample container arrangement is such that the carrier is kept in contact to the tempering module by negative pressure relative to ambient pressure.

10 Claims, 1 Drawing Sheet

(52) U.S. Cl.
CPC .................. *B01L 2300/1822* (2013.01); *B01L 2300/1827* (2013.01); *B01L 2400/049* (2013.01)

(56) References Cited

U.S. PATENT DOCUMENTS

| | | | | |
|---|---|---|---|---|
| 2004/0178074 | A1* | 9/2004 | Woudenberg | B01L 3/502723 204/542 |
| 2005/0084867 | A1 | 4/2005 | Caren et al. | |
| 2010/0099581 | A1* | 4/2010 | Arciniegas | B01L 3/50851 506/28 |
| 2012/0152403 | A1* | 6/2012 | Barrett | G01N 33/84 141/9 |

* cited by examiner

SAMPLE CONTAINER ARRANGEMENT

CROSS-REFERENCE TO RELATED APPLICATIONS

This application is a National Stage entry of International Application No. PCT/EP2017/074613, filed Sep. 28, 2017, which claims priority to European Patent Application No. 16020361.8, filed Sep. 29, 2016.

BACKGROUND

Field of the Invention

The present invention relates to a sample container arrangement and a method for tempering at least one sample container provided in a sample container arrangement.

Description of the Related Art

Samples to be investigated have to be held safe and well-positioned during examination. In many cases it is necessary to temper, i. e. to cool or to heat, the sample. Furthermore, it might be necessary to move the sample during examination.

To ensure correct and fast tempering of the sample, for example for nucleic acid amplification, as in PCR (polymerase chain reaction) or HDA (Helicasedependent amplification), a sample container must have a well-defined and good thermal contact to a tempering unit. With regard to the thermal contact resistance, stress or pressure is a crucial size. For sample containers being provided in a rotating disposable arrangement, known solutions using a mechanical contact pressure are in many cases not suitable.

Document U.S. Pat. No. 7,754,474 B2 shows a sample processing system for processing sample materials located in sample processing devices. The sample processing system includes a rotating base plate on which the sample processing devices are located during operation. The system includes a cover and compression structure designed to force a sample processing device towards the base plate.

Therefore, the sample processing device is forced into contact with a thermal structure on the base plate.

In contrast to solutions using a physical contact, there are solutions using air heating systems. The disadvantage of such systems is that air heating offers a poor heat transfer as air has a low heat capacity.

Furthermore, there are systems using a physical contact without a defined thermal contact as PCR tube cyclers and plate cyclers. These systems are difficult to handle when using movable sample containers. Moreover, the undefined heat transfer can deteriorate the PCR performance.

Furthermore, use of infrared heatings might be possible. However, temperature control in such a system would be difficult. Particle heating systems using a laser beam are only suitable for special assays having gold particles.

Document US 2005/0084867 A1 discloses an apparatus and method comprising a rotatable support for one or more linear arrays, a mechanism for rotating the support, and a device for examining the linear arrays. Each of the linear arrays comprises a plurality of features for conducting chemical reactions.

Document EP 2 263 802 A1 discloses a system and method for dispensing fluids. The system comprises a holder for holding a multi-well plate in a predefined holding position. The multi well plate has a well region provided with plural wells for accommodating fluids and an edge region surrounding the well region. The holder includes a contact area adapted to contact the edge region for forming a sealing zone.

Document WO 2005/107938 A2 discloses a thermal reaction device and method for using the same. The device comprises a plurality of reaction cells in communication with one of either a sample inlet or a reagent inlet through a via formed within an elastomeric block of the device.

SUMMARY OF THE INVENTION

In contrast thereto, the invention proposes a sample container arrangement according to claim 1 using a negative pressure to ensure safe contact between sample container(s) and a tempering module. Therefore, the contact problem mentioned above is solved by using negative or low pressure causing the sample container or the sample containers to be sucked to the tempering module and therefore, the at least one tempering element within the tempering module. This negative pressure, i. e. the negative relative pressure compared to ambient pressure, causes the ambient pressure to push the sample container(s) or the carrier comprising the sample container(s) to or against the tempering module during operation.

The at least one sample container is formed within the carrier, wherein at least one cavity is formed between the carrier and the tempering module, the cavity can be put under negative pressure, wherein the at least one cavity is formed by formation of adjacent sides of the carrier and the tempering module.

The adjacent side of the carrier can have a zigzag design. The zigzag design of the adjacent side of the carrier can determine the number and arrangement of the cavities and the sample containers.

By adjusting the negative pressure, it can be made sure that the sample containers have a defined thermal contact to the tempering module in spite of fabrication tolerances. Particularly, this can be guaranteed when using a carrier made of a flexible material, e.g. a disposable made of a flexible material.

The proposed sample container arrangement comprises a carrier for at least one sample container and a tempering module comprising at least one tempering element and being at least sectionally in contact with the carrier such that the at least one tempering element is suitable to temper the carrier and the sample container, respectively, wherein the sample container arrangement is such that the carrier is kept in contact to the tempering module by negative pressure.

Therefore, the at least one sample container is pressed against the tempering module such that the side of the carrier adjacent to the tempering module is at least partially or sectionally in contact to the side of the tempering element adjacent to the carrier. Accordingly, at least a part of the mentioned side of the carrier forming a first contact area is in contact to at least a part of the mentioned side of the tempering module forming a second contact area. Optionally, more than one side of the tempering module can be tempered.

Caused by the negative pressure even a moving or rotating carrier, for example a disposable, is sucked to or pressed against the tempering module to provide a good and well-defined thermal contact. Hence, a fast and exact tempering, i.e. cooling or heating, of the sample container(s) and therefore, the sample(s) in the sample container(s) is ensured. The arrangement can be used for DNA identification by PCR or HDA for example.

Furthermore, the negative pressure can be used for positioning of the carrier, e.g. a disposable to enable a simple insertion and removal of the sample(s).

The arrangement and the method described herein can be used for identification of nucleic acid by amplification using PCR, HDA or other amplification methods.

The used solid state heating, e.g. using Peltier elements or an electrical heating, used for heating the sample containers can be used for amplification methods. The contact areas provide a well-defined heat transfer guaranteed by the negative pressure.

As the at least one sample container is formed within the carrier, the at least one sample container is realized by a hole or cavity within the carrier.

The carrier can be a disk having a circular cross-sectional area. This disk can be rotated together with the tempering module which also can have a circular cross-sectional area. Furthermore, the arrangement can be such that it can be rotated, preferably, in both directions.

Independent of the shape of the carrier or the tempering module, the cross-sectional area of the tempering module can correspond to the cross-sectional area of the carrier.

In one embodiment, the at least one sample container is in alignment with the at least one tempering element. Therefore, in use the at least one sample container and the at least one tempering element lie one upon the other enabling an efficient heat transfer.

In a further embodiment, the carrier is a disposable based on centrifugal micro fluidics. The disposable can be a thin plastic disc having a wall thickness of less than 20 mm. Furthermore, the disposable can be a film or foil disk having a wall thickness of less than 0.5 mm Moreover, at least one cavity or zone can be formed between the carrier and the tempering element, the cavity or zone can be put under negative pressure. The at least one cavity can be formed by formation of the adjacent sides of the carrier and the tempering module. The at least one zone can be formed within the tempering module and/or within the carrier.

To improve steadiness of the negative pressure, at least one seal can be provided between the carrier and the tempering module. This at least one seal can be part of the tempering module and/or the carrier. The at least one seal can be a seal having a circumferential course.

Furthermore, at least one air connection can be formed within the tempering module to connect at least one vacuum pump. In this case a valve system can be provided for undocking the vacuum pump, particularly, for undocking the vacuum connections for reducing friction and wear.

Moreover at least one temperature sensor can be provided to control the temperature within the sample container(s).

In one embodiment, the arrangement is adapted for detection by fluorescence.

In a further embodiment, the arrangement is adapted for detection by absorption.

In a further embodiment, the arrangement is adapted for detection by luminescence.

The tempering module can comprise at least one Peltier element for cooling or heating as a tempering element. Alternatively, an electrical heating system can be provided. In another embodiment, an inductive heating is provided using metal pads rotating with the arrangement.

In another embodiment, the arrangement comprises a number of sample containers, the temperature of each sample container can be controlled individually. For this, at least one temperature sensor can be used.

Furthermore, at least one pressure sensor can be used for controlling operation of the vacuum pump and for controlling the negative pressure.

Energy transfer for heating can be done by at least one sliding contact or inductively.

Within the proposed method for tempering, i.e. cooling or heating, at least one sample uses an arrangement as described above. The at least one sample is put into a sample container of the arrangement and when the heating or cooling of the tempering module is switched on by switching on the at least one tempering element. By negative pressure, the sample container and the heating element are held together. The negative pressure can be used during positioning of the carrier and during insertion of the sample into the sample container.

Further features and embodiments of the invention will become apparent from the description and the accompanying drawings.

It will be understood that the features mentioned above and those described hereinafter can be used not only in the combination specified, but also in other combinations or on their own, without departing from the scope of the present invention.

The invention is diagrammatically illustrated in the drawings by means of an embodiment by way of example and is hereinafter explained in detail with reference to the drawings. It is understood that the description is in no way limiting on the scope of the present invention and is merely an illustration of a preferred embodiment of the invention.

DETAILED DESCRIPTION

Figure 1:
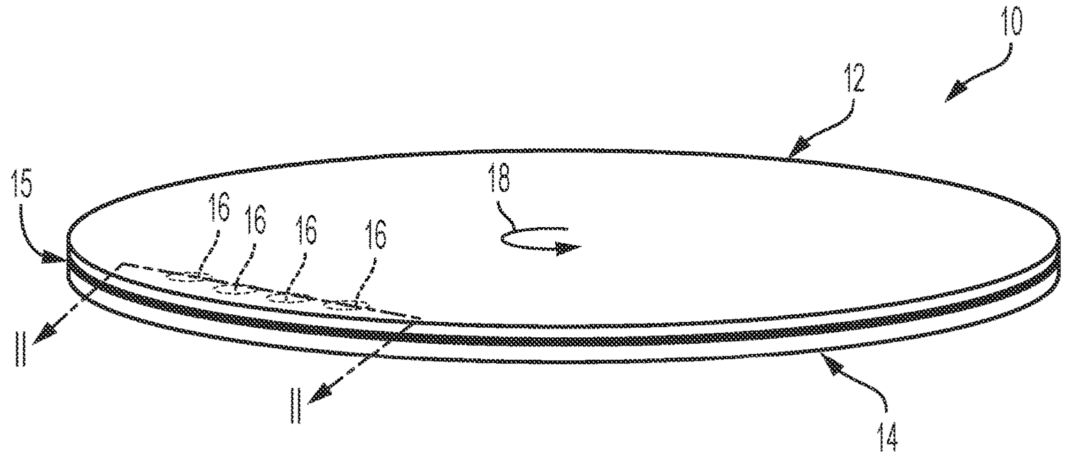
FIG. 1 is an overall view of a sample container arrangement comprising a tempering unit.

The figures are described cohesively and in overlapping fashion, the same reference numerals denoting identical parts.

FIG. 1 shows a sample container arrangement overall denoted with reference number 10. The arrangement 10 comprises a carrier 12 which is in this embodiment a disk-shaped disposable having a circular cross-sectional area. Furthermore, the arrangement 10 comprises a tempering module 14 which is also formed as a disk having a circular cross-sectional area. Therefore, the carrier 12 and the tempering module 14 congruently lie one upon the other.

Within the carrier 12 a number of sample containers 16 are formed. The arrangement 10 can be rotated as illustrated with arrow 18. The arrangement 10 is such that it can be rotated in both directions.

Figure 2:
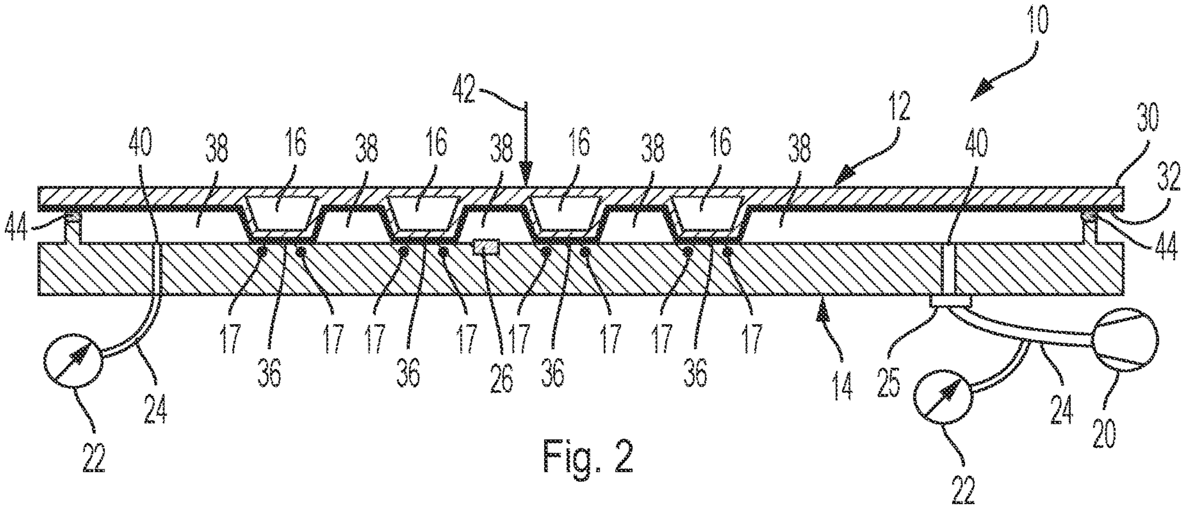
FIG. 2 is a sectional view of the sample container arrangement according to FIG. 1.

FIG. 2 shows a sectional view through the arrangement 10 in FIG. 1. The drawing shows the arrangement 10 comprising the carrier 12 and the tempering module 14 which lie upon each other. Within the tempering module 14 are provided tempering elements 17. These are in alignment with the sample containers 16.

Furthermore, the drawing shows a vacuum pump 20, two pressure sensosr 22, particularly, differential pressure sensors, air lines 24 and a temperature sensor 26.

The carrier 12 has a first side 30 and a second side 32 which is opposite to the tempering module 14. The second side 32 is formed such that a number of sample containers

16 are formed within the carrier 12. The sample containers 16 can be formed by formation of the first side 30 as well. The second side 32 of the carrier 12 is in contact to the tempering module 14 in the range of the sample containers 16. The second side 32 can be in direct contact with the tempering module 14 or indirectly via a heat conduction medium 36 which is provided between the tempering module 14 and the second side 32 of the carrier 12. This medium 36 defines the thermal contact between the carrier 12 and the tempering module 14.

The second side 32 of the carrier and the side of the tempering module 14 opposite to this second side 32 are the adjacent sides as mentioned in claim 1.

Between the carrier 12 and the tempering element 14 a number of cavities 38 are formed. In this embodiment, the zigzag design of the carrier 12, particularly, the design of the second side 32 of the carrier 12 in the shown longitudinal section, determines the number and arrangement of the cavities 38 and the sample containers 16.

Within the tempering module 14 there are air connections 40 through which the air lines 24 are conducted to connect the vacuum pump 20 to the cavities 38 between the carrier 12 and the tempering element 14. Therefore, the cavities 38 can be put under negative pressure in comparison to ambient pressure 42.

To improve steadiness of the negative pressure in the cavities 38 a seal 44 is provided between the carrier 12 and the tempering element 14.

The negative pressure can be used for positioning and fixing of the carrier 12 in relation to the tempering module 14. The tempering can be performed only in small regions in the range of the sample containers 16 to reduce the thermal capacity. Therefore, the tempering can be performed faster and less energy is consumed.

The arrangement 10 can be designed as a point of need device being small, light, and portable. Batteries can be used as energy storage as only small areas have to be tempered. The thermal contact can be improved by using a heat conduction medium, e.g. a heat conduction film or a heat conduction adhesive.

The vacuum pump 20 can be designed for rotating or moving together with the arrangement using sliding contacts. Using a stationary pump, a valve 25 can be used for relief of the seal and reducing the friction.

Heating can be performed with help of Peltier elements or an inductive heating. Cooling can be performed by air.

The shown arrangement 10 illustrates that there can be different zones for heat transfer and for providing a vacuum, i.e. there are tempering zones and vacuum zones.

The invention claimed is:

1. A sample container arrangement comprising:

a carrier defining a plurality of sample containers, the carrier being a first disk having a first circular cross-sectional area, and a tempering module, the tempering module being a second disk having a second circular cross-sectional area that is axially aligned with the first circular cross-sectional area of the carrier, the tempering module comprising a plurality of tempering elements disposed in vertical alignment with each of the plurality of sample containers, the tempering module being in contact with each of the plurality of sample containers of the carrier such that the plurality of tempering elements is configured to cool or heat of the plurality of sample containers, wherein the tempering module and the carrier defines a cavity therebetween, the cavity being disposed laterally adjacent to each of the plurality of sample containers, wherein the carrier is configured to rotate with the tempering module, wherein the the carrier is kept in contact with the tempering module by negative pressure in the cavity relative to ambient pressure external to the sample container arrangement, said negative pressure being maintained even when the carrier rotates with the tempering module, wherein each of the plurality of sample containers define a first side configured to receive a sample and a second side opposite to the first side, the second side being in contact with the tempering module, wherein the negative pressure is created by a vacuum pump connected to the cavity through the tempering module.

2. The arrangement according to claim 1, wherein at least one seal is provided between the carrier and the tempering module.

3. The arrangement according to claim 1, wherein the tempering module further comprises at least one air connection through which an air line is conducted to connect to the vacuum pump.

4. The arrangement according to claim 1, wherein the vacuum pump further comprises a valve system for undocking the vacuum pump.

5. The arrangement according to claim 1, wherein the tempering element of the tempering module comprises at least one Peltier element.

6. The arrangement according to claim 1, wherein the arrangement further comprises at least one temperature sensor.

7. The arrangement according to claim 1, wherein the arrangement is configured to rotate with the vacuum pump via sliding contacts.

8. The arrangement according to claim 1, wherein the tempering module is directly in contact with each of the plurality of sample containers of the carrier.

9. The arrangement according to claim 1, wherein the tempering module is indirectly in contact with each of the plurality of sample containers of the carrier via a heat conduction medium.

10. The arrangement according to claim 1, wherein the arrangement further comprises two differential pressure sensors to verify the negative pressure in the cavity relative to the ambient pressure external to the sample container arrangement.

* * * * *